US007732797B2

United States Patent
Stimpson et al.

(10) Patent No.: US 7,732,797 B2
(45) Date of Patent: Jun. 8, 2010

(54) DETECTION DEVICE AND METHOD FOR DETECTING OBJECTS SUBJECT TO CYCLIC OR REPETITIVE MOTION

(75) Inventors: Victor Gordon Stimpson, Avening (GB); Colin Timothy Bell, Berkeley (GB); William Kenneth Davies, Bristol (GB); Paul Maxted, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 485 days.

(21) Appl. No.: 11/659,848

(22) PCT Filed: Sep. 7, 2005

(86) PCT No.: PCT/GB2005/003449

§ 371 (c)(1),
(2), (4) Date: Feb. 9, 2007

(87) PCT Pub. No.: WO2006/027577

PCT Pub. Date: Mar. 16, 2006

(65) Prior Publication Data

US 2007/0217673 A1    Sep. 20, 2007

(30) Foreign Application Priority Data

Sep. 8, 2004  (GB)  ................. 0419943.6
Oct. 1, 2004  (GB)  ................. 0421853.3
Jan. 21, 2005 (GB)  ................. 0501182.0

(51) Int. Cl.
*G01N 21/86* (2006.01)
*G01V 8/00* (2006.01)

(52) U.S. Cl. ................ 250/559.4; 250/559.29; 250/559.14; 356/511; 356/638

(58) Field of Classification Search ........... 250/559.4, 250/559.29, 559.12, 559.14; 356/511, 638, 356/640, 625, 602, 623, 614; 324/642; 382/152
See application file for complete search history.

(56) References Cited

U.S. PATENT DOCUMENTS 4,148,587 A    4/1979    Erdmann et al.

(Continued)

FOREIGN PATENT DOCUMENTS

DE    0153 746    1/1982

(Continued)

OTHER PUBLICATIONS

Excellon Automation Broken Tool Detector Service Manual, 211012-17, Rev. B, Jun. 1985, pp. 6-1, 6-2 and 7-4.

(Continued)

*Primary Examiner*—Seung C Sohn
(74) *Attorney, Agent, or Firm*—Oliff & Berridge, PLC

(57) ABSTRACT

A device and method for detecting the presence or absence of an object which has repetitive motion are disclosed comprising, a receiver for receiving a signal from the object, and circuitry for determining the presence or absence of the object to be detected, wherein the circuitry records the signal from the receiver as a pattern of data during at least part of the repetitive motion of the object, compares the data with a previously recorded data pattern and, produces an output signal based on the comparison. The signal may be received during discrete time intervals, and may be light which can be transmitted with varying intensity. The circuitry may determine the value of signal received at a receiver and produce a binary value. The signal received at the receiver can be reflected from the object to be detected.

19 Claims, 6 Drawing Sheets

U.S. PATENT DOCUMENTS

| | | | |
|---|---|---|---|
| 4,340,326 A | 7/1982 | Buonauro et al. | |
| 4,502,823 A | 3/1985 | Wronski et al. | |
| 4,507,834 A | 4/1985 | Chen et al. | |
| 4,613,812 A | 9/1986 | Gelston, II | |
| 4,654,523 A | 3/1987 | Tanaka et al. | |
| 4,657,395 A | 4/1987 | Shiraishi et al. | |
| 4,667,113 A | 5/1987 | Nakajima et al. | |
| 4,678,337 A | 7/1987 | Cohen et al. | |
| 5,005,978 A | 4/1991 | Skunes et al. | |
| 5,189,625 A | 2/1993 | Le Floch | |
| 5,293,048 A | 3/1994 | Skunes et al. | |
| 5,636,026 A * | 6/1997 | Mian et al. | 250/559.19 |
| 5,940,787 A | 8/1999 | Gelston | |
| 6,292,261 B1 | 9/2001 | Fishbaine et al. | |
| 6,538,750 B1 | 3/2003 | Fishbaine et al. | |
| 6,635,894 B1 | 10/2003 | Stimpson et al. | |
| 6,878,953 B2 | 4/2005 | Stimpson et al. | |
| 7,053,392 B2 | 5/2006 | Stimpson et al. | |

FOREIGN PATENT DOCUMENTS

| | | |
|---|---|---|
| DE | 3410149 A1 | 10/1985 |
| DE | 34 344 61 A1 | 3/1986 |
| DE | 3434461 | 3/1986 |
| DE | 3504194 A1 | 6/1986 |
| DE | 239 369 A1 | 9/1986 |
| DE | 3731171 A1 | 3/1989 |
| DE | 39 05 949 A1 | 8/1990 |
| DE | 3905949 A1 | 8/1990 |
| EP | 0153 746 | 1/1982 |
| EP | 0 493 908 A1 | 7/1992 |
| EP | 1 050 368 A1 | 11/2000 |
| EP | 1 144 944 B1 | 4/2005 |
| EP | 1 562 020 A1 | 8/2005 |
| GB | 1 510 299 | 5/1978 |
| GB | 2 003 407 A | 3/1979 |
| GB | 2 150 284 A | 6/1985 |
| GB | 2 200 747 A | 8/1988 |
| JP | A-53-035568 | 4/1978 |
| JP | A-60-40255 | 4/1985 |
| JP | A-62-124809 | 6/1987 |
| JP | A-63-058203 | 3/1988 |
| JP | A-63-237805 | 4/1988 |
| JP | A-63-163205 | 7/1988 |
| JP | 63-233403 | 9/1988 |
| JP | A-63-233403 | 9/1988 |
| JP | A-63-237805 | 10/1988 |
| WO | WO 01/38822 A1 | 5/2001 |
| WO | WO 03/021197 A1 | 3/2003 |
| WO | WO 2004/056528 A1 | 7/2004 |
| WO | WO 2006/027577 A1 | 3/2006 |

OTHER PUBLICATIONS

Optical Tool Breakage Monitoring Unit with Laser, Leuze press release, Feb. 24, 2003, pp. 1-3.
Leuze Electronic Technical Document and Partial Translation (date unknown, retrieved Jun. 27, 2002).
Broken Drill Detection System (date unknown, retrieved Jun. 27, 2002).
Balluff, online product information, retrieved Nov. 30, 2006.

* cited by examiner

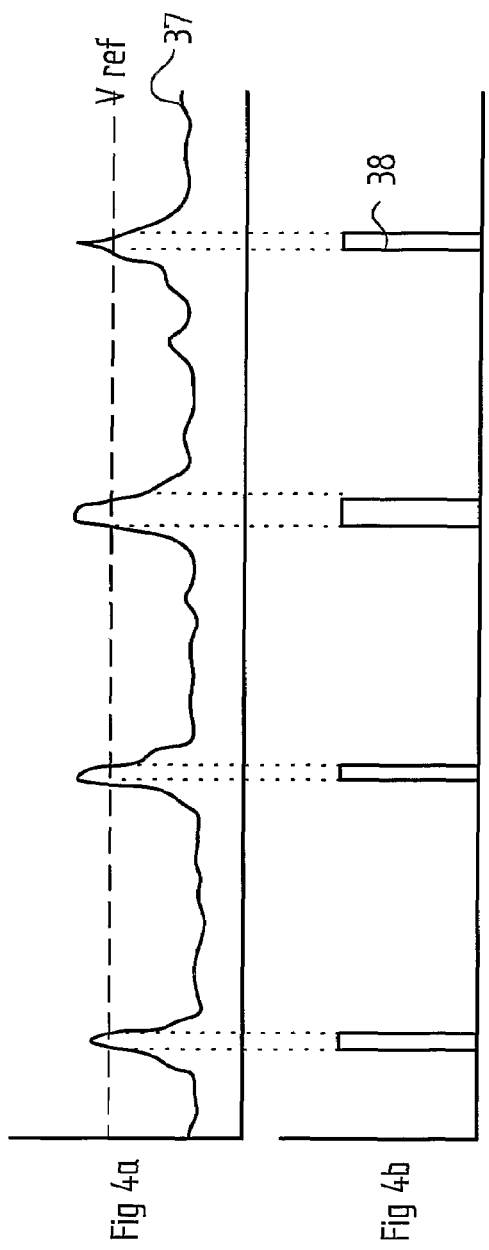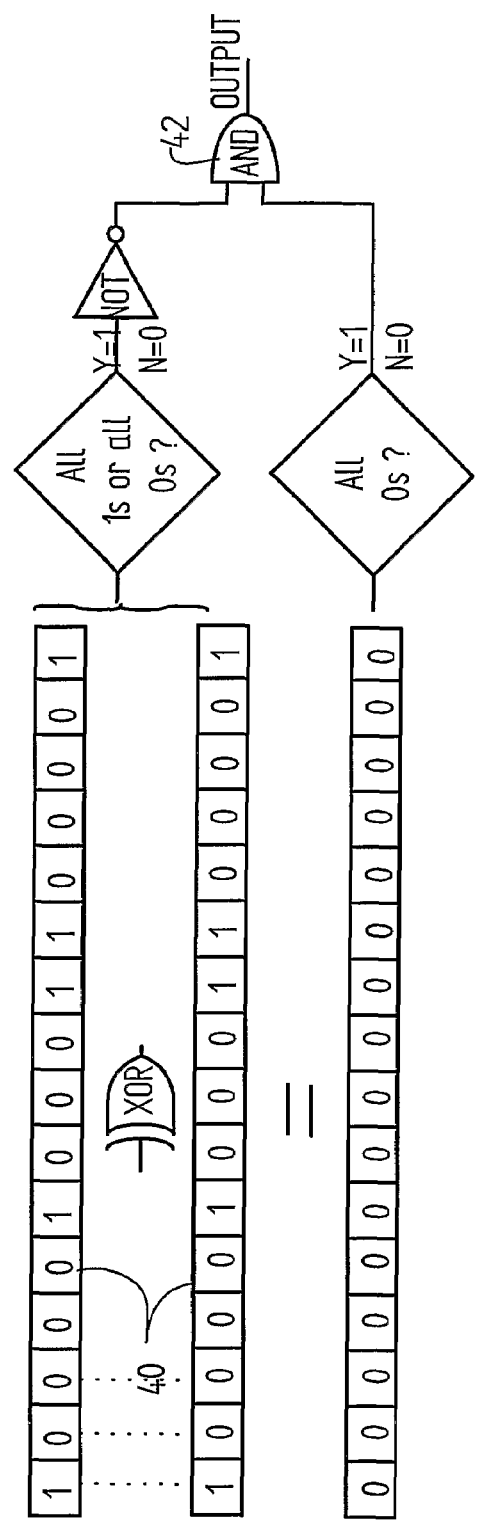
Fig 4a
Fig 4b
Fig 4c

DETECTION DEVICE AND METHOD FOR DETECTING OBJECTS SUBJECT TO CYCLIC OR REPETITIVE MOTION

BACKGROUND

This invention relates to a detection device and method of detection. More particularly, the invention concerns the detection of objects which rotate or are subjected to other cyclic or repetitive motion relative to the detection device. Particularly, but not exclusively, the object is a rotating tool for use with a machine tool. Additionally the invention relates to the detection of objects which come between the device and a rotating element.

Conventionally, tools and the like have been detected using the breaking or remaking of a beam of light which may propagate directly between an aligned light transmitter and receiver e.g. as shown in EP1050368.

A problem with this arrangement is that the tool etc has to fit between the light transmitter and receiver in order to be detected. Vibrations can cause transmitter and receiver misalignment which affects the detection of the tool. Additionally the tool has to be positioned accurately which is not always possible if the exact size of the tool is not known. In this type of system a shadow is formed on the detector by the tool or other article which passes through the beam and when that shadow obscures the beam by a predetermined amount, a tool present signal is produced.

Advantageously, the tool or the like can be used to reflect light and the transmitter and receiver can be mounted together. Such systems are described in U.S. Pat. No. 5,293,048, GB2200747A and DE 34 344 61. However, the amount of light reflected by the tool is limited because tools generally have poor reflectivity, so the light transmitter must be powerful in comparison to the power of the light transmitter of the aligned system described in the paragraph above. Where the light transmitter is a laser the output power required of the laser to produce a measurable reflection from the tool may exceed current safety limits.

In U.S. Pat. No. 5,940,787 the electromagnetic radiation from the region in which a tool contacts a workpiece is detected. Depending on the condition of the tool, characteristics of the signal received by a detector between contact and retraction of the tool changes. The signal characteristics are monitored and analysed to produce a control signal. Interference from coolant and debris are filtered, but in the case of a laser system, such filtering masks certain characteristics and slows the system down making a laser system unsuitable for those situations.

SUMMARY

According to a first aspect the invention provides a detection device for detecting the presence or absence of an object, the device comprising a light transmitter and a light receiver positioned relative to the light transmitter to receive light reflected by the object, characterised in that the transmitted light is transmitted with varying intensity.

According to a second aspect, the invention provides a method of detecting the presence or absence of an object, comprising the steps of: transmitting light towards the object; and receiving light reflected by the object; wherein, the transmitted light is transmitted with varying intensity.

Preferably the varying intensity is a variation between no light and full light transmitted by the light transmitter. In a preferred embodiment, the light is transmitted periodically.

Preferably the "on" period is 1-50 μS in every 2-100 μS, i.e. approximately 10-500 kHz. Preferably, the object is adjacent the device.

In this way the detection device does not detect light continuously but only at predetermined periods. This results in the periodic instantaneous power of the light transmitter being higher than the average output power because the light transmitter does not output light continuously. This higher periodic output power can be used to safely increase the amount of light received at the light receiver during the said periods without causing unsafe average levels of output light. The average output is preferably below current acceptable limits for unprotected viewing of the laser.

Also the varying intensity of light produces an alternating signal at the light receiver which can be readily amplified separately from the signal produced by the generally constant ambient light.

Problems associated with tool detection devices generally, particularly but not exclusively those of the type which utilise reflected light, include interference from other light sources and reflections or beam blockage from contamination of the detection environment. In U.S. Pat. No. 5,293,048, these issues are alleviated by use of a laser source which is angled with respect to the rotational axis of the tool. This reduces the problem of blockage by debris. If the reflected signal surpasses a certain threshold then a tool present signal is issued. If the threshold is not surpassed in the time taken for one revolution of the tool then the tool is considered broken.

A problem with the prior art is that any reflection that is above the threshold is recorded as a tool present signal thus false triggers from the presence of coolant or swarf occur. In addition, in the situation where there is more than one cutting edge provided on the tool, only one of these cutting edges is identified. In some situations, the tool is provided with through tool coolant. In this case, in order to perform a tool check one has to wait until the coolant has drained away which results in a delay in the machining process.

According to a third aspect the invention provides a device for detecting the presence or absence of an object which has repetitive motion, the device comprising a receiver for receiving a signal from the object and circuitry for determining the presence or absence of the object to be detected, characterised in that the circuitry records the signal from the receiver as a pattern of data during at least part of the repetitive motion of the object, compares the data with a previously recorded data pattern and, produces an output signal based on the comparison.

Thus, the circuitry produces an object detection output signal either when the pattern matches a previously recorded data pattern or when the pattern no longer matches a previously recorded data pattern.

According to a fourth aspect, the invention provides, a method for detecting the presence or absence of an object which has repetitive motion, the method comprising the steps of: receiving a signal from the object at a receiver; recording the signal from the receiver as a pattern of data during at least part of the repetitive motion of the object; comparing the data with a previously recorded data pattern; and producing an output signal based on the comparison.

In these aspects of the present invention, the art of tool breakage detection has been moved from identifying a beam obscuration or breakage or, registering that a reflected beam has an intensity which is above the threshold, i.e. a choice of on/off systems to the positive identification of a tool being present by pattern recognition i.e. the change in the beam is identified as being characteristic of a tool.

The repetitive motion can be a rotation or any other repeating motion.

Preferably the signal is light. In a preferred embodiment, the light is from a transmitter and the receiver receives light from the transmitter in order to produce the said signal. Preferably, the transmitted light is transmitted with varying intensity.

Thus in embodiments of the invention the circuitry of the device is able to find patterns of data which match, thus confirming the presence of the rotating object. The patterns of data may be selected or downloaded from historical data of drill bit patterns which are then compared to the current data or, in a preferred embodiment, current data is compared to previously recorded data received during at least one earlier rotation. The term previously recorded data in this specification includes both data recorded during an earlier rotation of the tool during the same inspection cycle and historical data.

An advantage of using historical data occurs when a tool having more than one cutting edge is being used. The absence of one or more of the cutting edges can be identified as the pattern produced will differ from the historical data. Advantageously, a mixture of the two types of data could be employed to flag that a tool should be changed soon as surface finish will be affected and the tool is more prone to breaking which increases the risk of creating scrap. Any geometrical change can be identified for example, that the wrong tool is in the chuck, which is flagged to an operator.

The object may be a cutting tool, the presence of which is to be confirmed, or a moving part of a machine, the tool being brought between the device and the moving part to prevent the object detection signal and thus to confirm its presence as a result of the discontinuation of an object found signal.

Preferably the circuitry determines the amount of signal received at the receiver during discrete time intervals and produces a value for each interval.

The circuitry either converts the value of signal (such as light) received into digitised form such as a binary value or an analogue signal is used. Binary is preferred as it enables simple processing that can be done real time. Preferably when the binary value or other pattern of data has a correlating relationship with the previous data then a tool found signal is issued by the circuit.

In this way a rotating tool or similar moving object will be detected when the patterns of two or more sets of data are compared and matched. Preferably the amount of signal received at the receiver is monitored and if a threshold is exceeded during any one interval then the binary value of the data is recorded as a 1. Alternatively, if the value of the signal does not reach the threshold during the interval then a binary 0 is recorded.

BRIEF DESCRIPTION OF THE DRAWINGS

Embodiments of the invention will now be described with reference to the drawings, wherein:

FIGS. 4a, b and c show diagrammatic representations of the operation of the circuitry shown in FIG. 3;

DETAILED DESCRIPTION OF THE PREFERRED EMBODIMENTS

Figure 1:
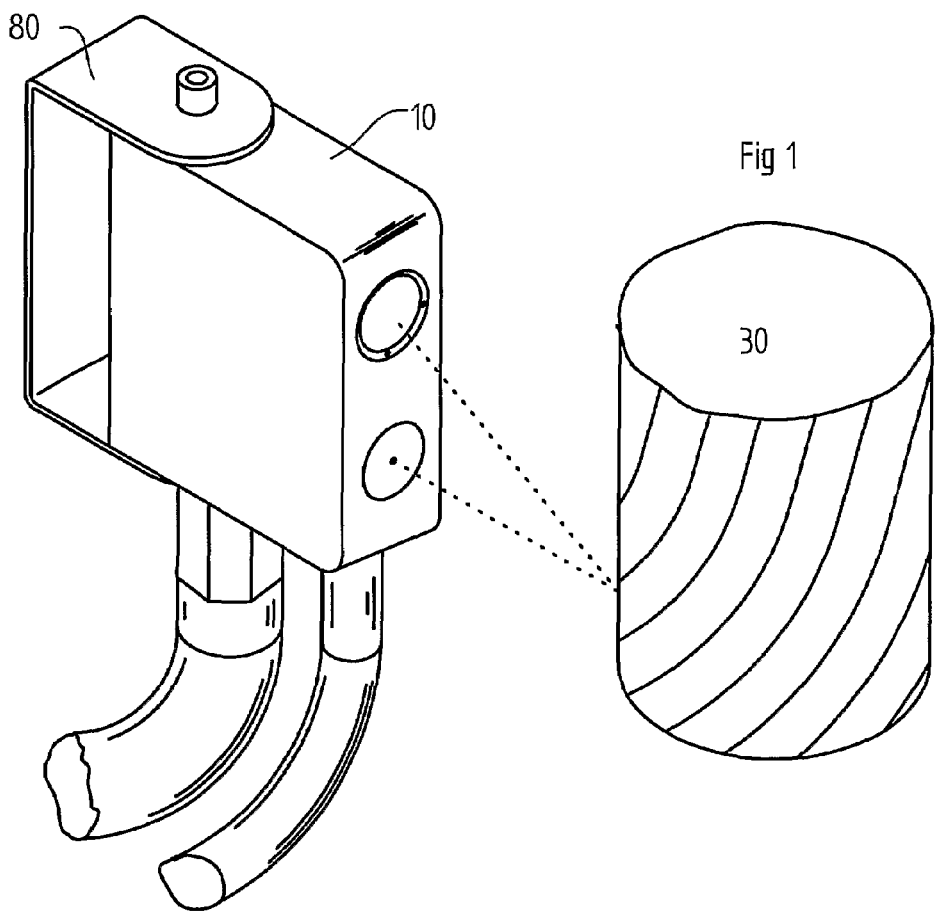
FIG. 1 shows a detection device according to the invention in use as a cutting tool detector.

FIG. 1 shows a pictorial view of a detection device 10 and a mounting bracket 80 for fixing the device to a machine or the like. Shown also is a portion of a tool 30 which is to be detected by the detector 10.

Figure 2:
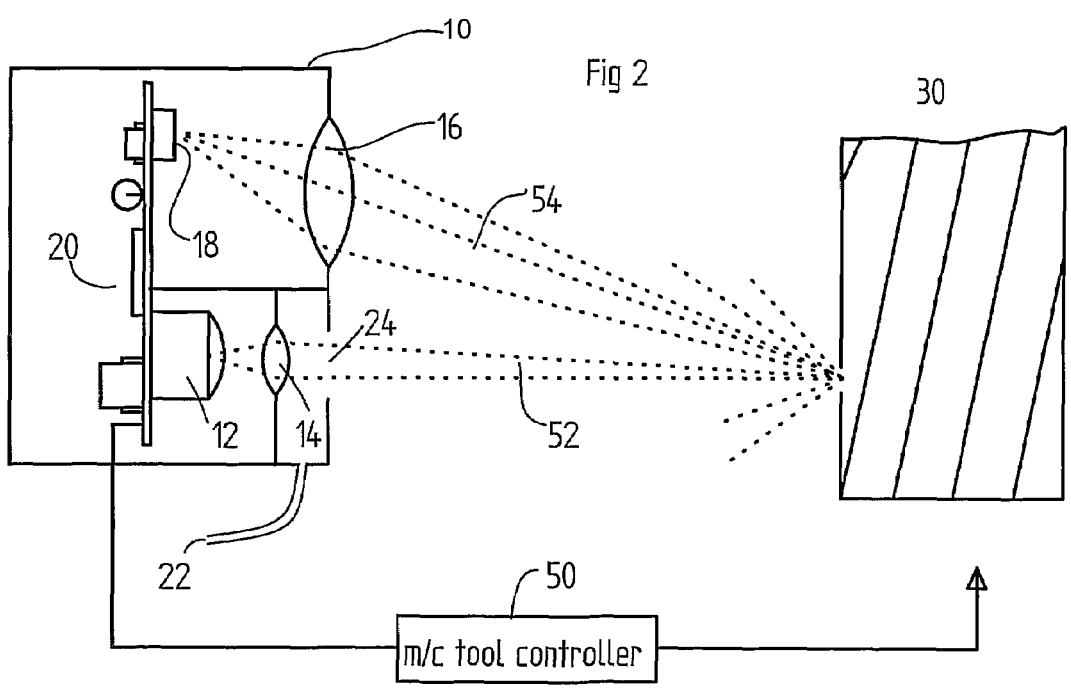
FIG. 2 shows a schematic diagram of the device shown in FIG. 1.

FIG. 2 shows the same device 10 in section. Shown are a laser diode light transmitter 12, a transmitter focusing lens 14, an output light path 52, a reflected light path 54, a receiver lens 16 and a photodiode light receiver 18. The light is transmitted nominally normally to the tool 30.

Light issued from the laser 12 is focused approximately at the point where the tool 30 is expected, along path 52. When the a rotating tool 30 is present the transmitted light is reflected, at least along reflected light path 54. Reflected light 54 is then focused by lens 16 onto the photodetector 18.

In the machining environment, particles of debris can obscure the laser beam 52,54 and the lenses 14,16. To alleviate this, the transmitter lens 14 is provided with an air supply 22 which flows out into the machine environment via an aperture in housing 24 and the receiver lens 16 is larger than required so if any particles do stick to the surface or an oil film partially coats the surface, there is sufficient surface area remaining to enable the signal to be received. Thus the system has in built redundancy so, the reflected signal can deviate from the optimal path and still be received.

The detector device 10 includes circuitry 20, in this instance mounted inside the device 10. The circuitry 20 is shown in detail in FIG. 3. When the circuitry detects (or does not detect) a tool 30 an output signal is sent to the controller 50 which controls operations of the tool 30.

Figure 7A:
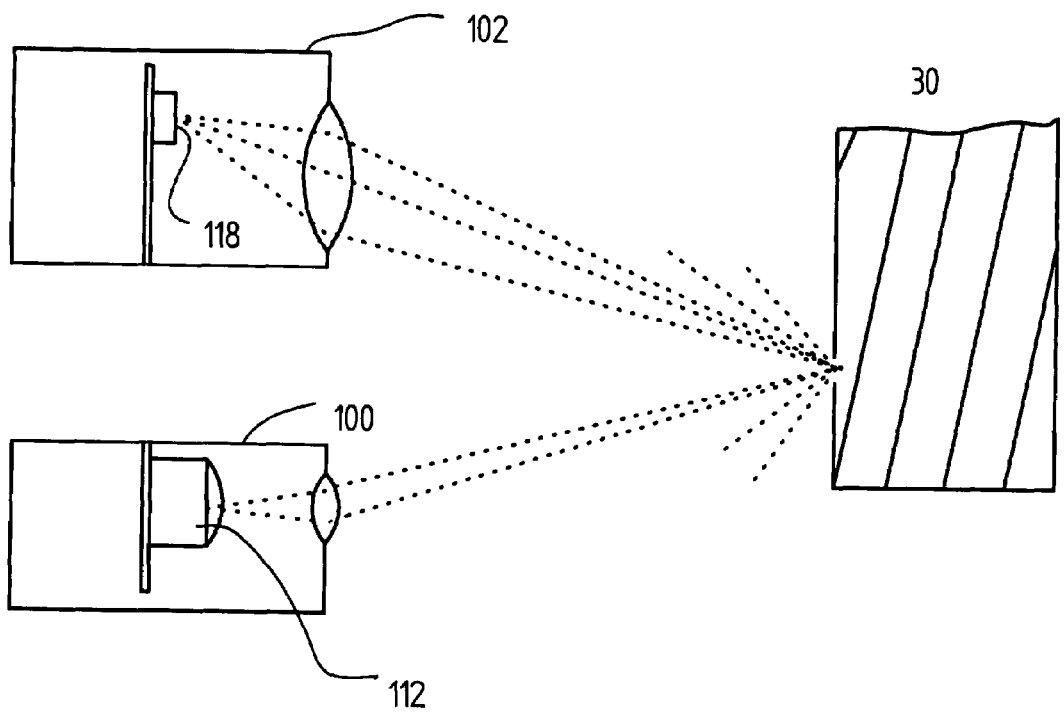
FIGS. 7a and b show alternative configurations of a device according to the invention.
Figure 7B:
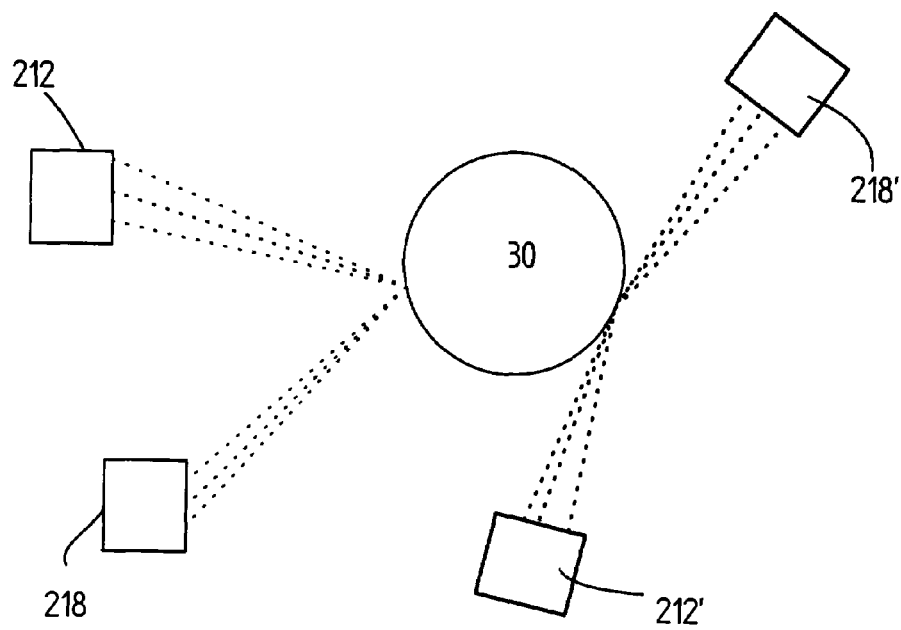

FIGS. 7a and 7b show alternative arrangements of a device according to the invention. In FIG. 7a, the transmitter 112 and receiver 118 are displaced vertically from each other and provided in separate housings 100 and 102 respectively. In FIG. 7b, two sets of transmitters and receivers 212/218 and 212'/218' respectively are shown. In both cases, the transmitter/receiver pair lies in substantially the same vertical plane but, they are radially displaced about the rotating axis of the tool 30. In one case 212/218 the angle of displacement is less than 90°. In the other case 212'/218' the angle of displacement is between 90° and 180°.

Figure 3:
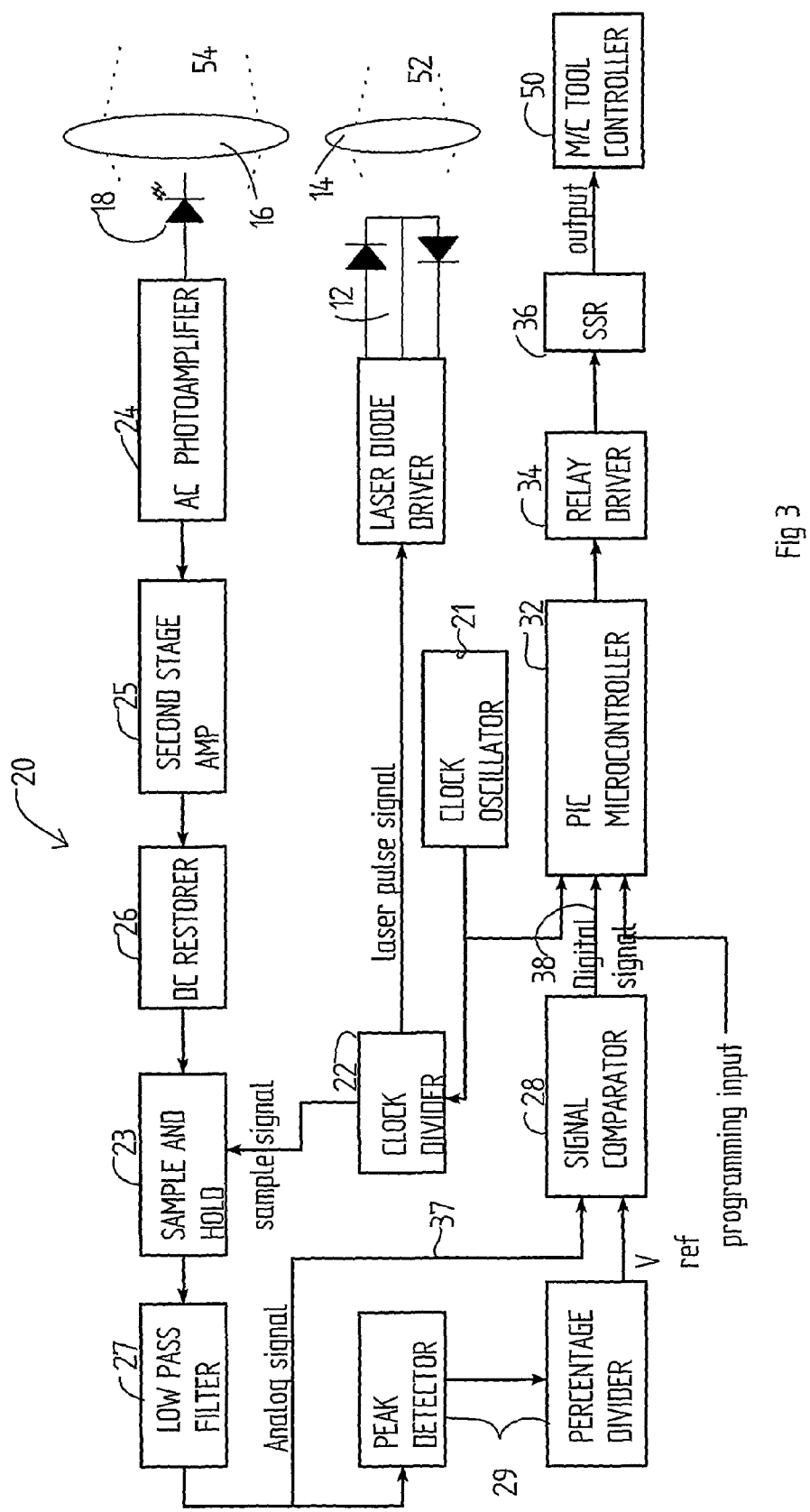
FIG. 3 shows a block circuit diagram of circuitry for use in the detection device shown in FIGS. 1 and 2.

Referring to FIG. 3 an oscillator 21 and a divider circuit 22 are shown. The divider 22 produces two synchronised outputs. The first output is a signal to trigger the laser and the second output is a signal to a sample and hold circuit 23. The signal from the divider circuit operates at about 150 kHz. At this frequency the laser diode 12 is constantly flashing on and off at a rate which, to a machine operator or observer appears as a weak laser output. Thus the average light output 52 of the laser 12 will be below currently acceptable limits for unprotected viewing of the laser. Consequently the output 52 from the laser is safe for the operator.

Reflected light 54 returning to the lens 16 and ambient light is detected by the photodiode 18 and its analogue signal is amplified in a two-stage amplifier 24/25. A DC restorer 26 holds the alternating signal about a suitable voltage to stop it wandering due to changes e.g. in ambient light levels. The sample and hold circuit 23 is triggered at approximately the same time as the laser by the synchronised signal from the clock divider circuit 22. The signal produced by the amplifier 24/25 will represent one flash of the laser light 52. A signal 37 from the sample and hold circuit is so frequent (150 kHz) that it appears continuous as shown in FIG. 4a although in practice one sample is taken approximately every 6 μSec. The sampled signal is then filtered in a low pass filter 27 to remove unwanted high frequency noise. The periodic analogue signal from the filter is then split and fed to a signal comparator and reference voltage producing circuitry 29 comprising a peak signal strength detector and a percentage dividing circuit. The output from the reference voltage circuit 29 Vref is thus a percentage of the peak analogue signal strength from the low pass filter 27. This reference voltage Vref is compared with the analogue signal 37 and the comparator 28 produces an output only when the analogue signal exceeds the reference voltage. This will happen only when the amount of light at the photodetector is abnormally high i.e. when the laser light 54 is reflected onto the photodetector 18. The output 38 from the comparator 28 is shown in FIG. 4b. If the tool 30 is rotating and has teeth or other irregularities then the amount of light detected by the photodetector will peak regularly as the teeth etc move into the pulses of light 52 and cause reflections 54 which are detected by the detector 18. The pulses occur so frequently that rotating teeth etc are not missed by the detection circuitry.

The output from the comparator 28 is fed into a microcontroller 32. The microcontroller is programmed via a programming input and has a clock to keep it synchronous with the sampling rate. The microcontroller monitors the digital input signal over a period of time and if the signal is obtained from the comparator then the microcontroller records this event as a binary "1". Otherwise a binary "0" is recorded. In this example the period is 3.75 mS. Put another way the period is one 16th of a revolution of a tool which rotates at 1000 rpm. Other periods are possible. The recordings are entered into a 32 bit register 40 shown in FIG. 4c in a scrolling manner, new data constantly displacing the old data by one place.

Line 1 of FIG. 4c shows recordings of the microcontroller for one revolution of the tool 30 which corresponds to the signals shown in FIGS. 4a and b. Line 2 represents data which was recorded during the revolution of a tool prior to the revolution of the tool recorded in line 1. The data in line 2 has been displaced from line 1. In practice the register is long enough to hold data which is 120 mS old, i.e. two revolutions of the tool rotating at 1000 rpm. In practice, in this embodiment lines 1 and 2 are one register.

The entries in lines 1 and 2 of the register are exclusively ORed as shown to get the resultant line 3. Line 3 will only be all 0s when lines 1 and 2 match, lines 1 and 2 will match only when they have the same pattern of data. Lines 1 and 2 will have the same pattern of data when a rotating tool or the like reflects light onto the photodetector 18 at the same point in time during each revolution of the tool. Thus line 3 will contain all 0s when the tool is rotating at the detector 10.

Additionally line 3 will contain all 0s when lines 1 and 2 contain all 1s or all 0s. This is possible when no tool is present, when light beam 52 is constantly reflected onto the detector 10, or when excessive light reaches the detector. To prevent any of the above events causing the tool detector to false trigger, logic is used. If lines 1 and 2 contain all 1s or all 0s then a logical 0 is entered at AND gate 42. Only when lines 1 and 2 are not all 1s or not all 0s, and line 3 is all 0s does the AND gate trigger an output. It can be seen from the foregoing that a rotating object is required to produce an output from the circuitry 20. In general this output is fed to machine tool controller 50 via what is known as a skip line comprising a simple 24 volt on/off signal.

Alternatively, line 1 shows previously recorded data which has been selected or downloaded from a historical data source. In this embodiment, lines 1 and 2 comprise two registers which are compared in the manner previously described.

Figure 6:
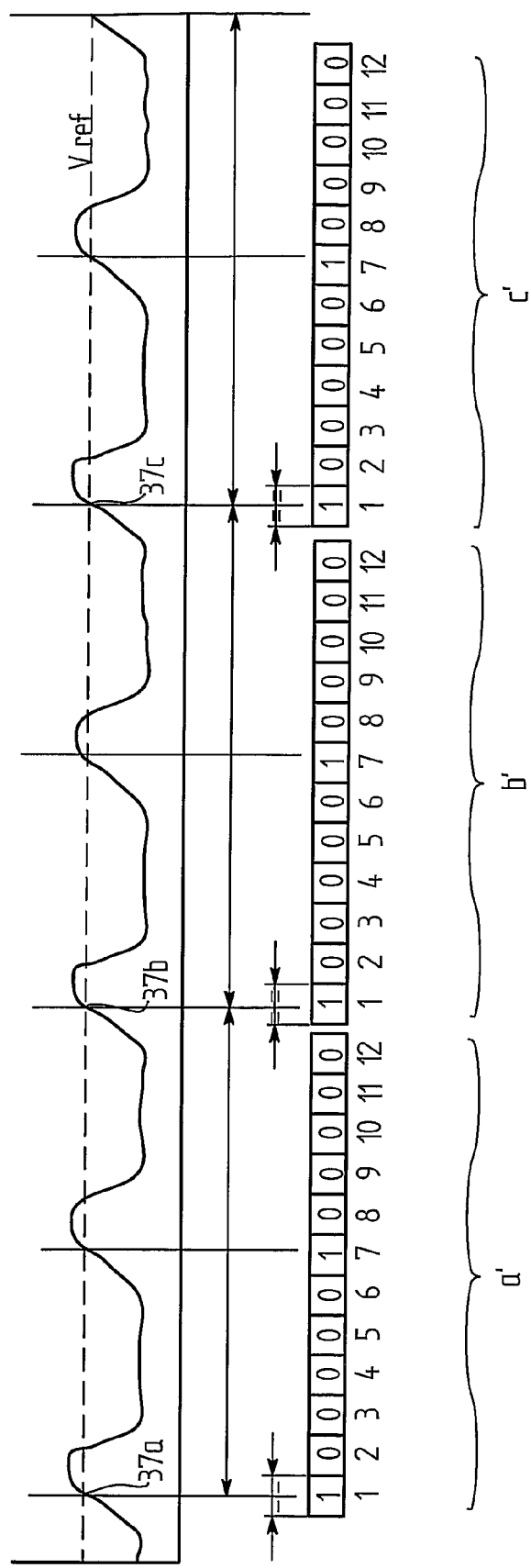
FIG. 6 shows a diagrammatic representation of an alternative operation of the circuitry shown in FIG. 3.

An alternative method of operation of the device illustrated in FIG. 3 is shown in FIG. 6.

When droplets of machine coolant saturate the environment adjacent the tool detector it is possible for these droplets to cause false triggering of the tool found signal. So, advantageously, to prevent false triggers the correlation of data is carried out over more than two revolutions.

In FIG. 6 matching patterns of data are sought over three (a, b and c) revolutions of the tool. Logic circuits are used as shown in FIG. 4c to produce a tool found signal if correlating data is found in the three parts a',b' and c' of the data in a register 41 i.e. matching 1s or 0s. More than three revolutions could be used. The determination of correlation data is made once every revolution (60 mS in this instance). The register 41 may be any length but 36 bits of information are required to be stored.

In practice, over the two revolutions shown in FIG. 4, the speed of clock 21 and the rotational speed of the tool need not be exactly synchronous because the short time period involved means that the two do not become out of phase significantly. Also, often the demanded and actual rotational speed of the tool do not match exactly.

However, using more revolutions to correlate data dictates that the clock sample speed and the rotation of the tool should be better matched to give accurate results. This can be as few as three but, is a function of the speed of rotation. It is not necessary to determine accurately the rotational speed of the tool with the present system.

In the method illustrated in FIG. 6 twelve samples per revolution are used instead of sixteen, i.e. one every 5 mS. This reduces the data per revolution collected. A two-tooth tool (such as a drill bit) is being detected which is rotating at approximately 980 rpm, instead of the desired 1000 rpm. When analogue signal 37 rises above a threshold Vref, a binary 1 is inserted into the current position of register 41. As before, the register is scrolling the new data pushing out the oldest data. When a first signal 37a is received the internal clock is reset so that the middle of the sample occurs at the receipt of signal 37a i.e. the next sample starts 2.5 mS later (and ends 7.5 ms later).

Such an adjustment occurs when no signal has been received for 60 mS (1 rev) in this instance, and then every signal 37b,c which occurs after the twelfth sample is taken, until no data is collected for 60 mS.

Thus, if a tooth is coming round again but the tool is not rotating at exactly 1000 rpm, then the tooth and the tool detector will be resynchronised at every revolution. This means the pattern of data which occurs due to the reflections of the teeth will not drift across the register positions 1 to 12 from one revolution to another, but will remain in the same register position during each revolution due to the resynchronisation of the clock with the tool at each revolution. Thus an increased number of revolutions can then be used to detect the tool which reduces the occurrence of false triggers or undetected tools.

In the example shown in FIG. 6 register a',b' and c' all have matching data despite the tool rotating at only 980 rpm because the recordings in the register are delayed slightly by an amount d at each thirteenth recording. The same concept can be used for a tool rotating too quickly. In such an instance the duration of the first sample after each twelfth sample will be cut so that the next sample starts 2.5 mS later.

Twelve samples per revolution is preferred because the number of teeth of the cutter is likely to be a factor of twelve.

If so, teeth detection signals will occur in the middle of the sample time not at the periphery of the sample time. Consequently, there is a reduced risk of a tooth detection signal floating from one sample position to an adjacent sample position during the three or more revolutions of the detection, and hence less chance of a tool being undetected due to the lack of correlating data. However, it will be appreciated that other sample rates and tool speeds can be used and it is a simple task for a person skilled in the art to calculate the relative sample times involved.

Figure 5:
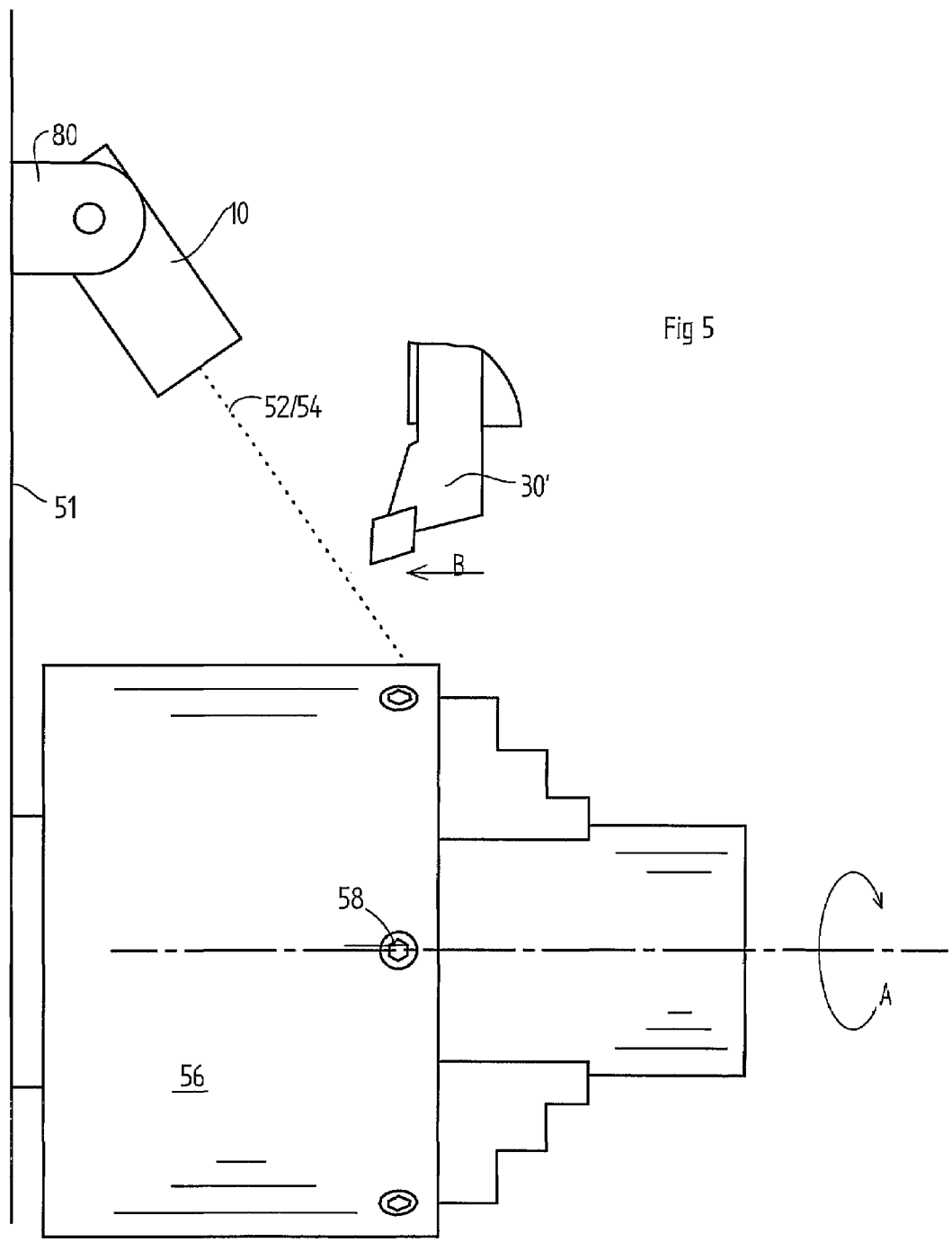
FIG. 5 shows the invention used in a different way.

However, not all machine tools have rotating tools. Lathes generally have non-rotatable tools and a workholding chuck which rotates. The tools are able to move only in a non-repeatable manner. FIG. 5 shows an embodiment of the invention for use with lathes and the like where tools do not rotate. Detector 10 is shown in plan view, fixed to the headstock 51 on the lathe and directed toward lathe chuck 56. Lathe chuck 56 rotates in the direction of arrow A. As described above, reflected features on the chuck will produce an output signal from the circuitry in the detector 10 when the chuck rotates. However, when lathe cutting tool 30' is brought into the beam 52 or 54 then the output signal will stop. Consequently the presence or absence of lathe tool 30' can be determined from the state of the output signal from the circuitry 20. Greater accuracy can be obtained if the light beam 52 is focused to the point where a lathe tool is expected to enter that beam.

In this embodiment, rather than the tool providing the pattern when it interacts with the beam thus the production of the pattern means that the tool is present, it is the inverse situation. It is the absence of the pattern produced by the chuck which is indicative of a tool being present. In either case, a change in the data stream either producing the pattern or obscuring the pattern indicates that a tool is present.

In the embodiments described so far, light which has been reflected off an object—either a tool or a chuck—is directed to the receiver. In an alternative example, light which is emitted from the object is directed to the receiver for example, the object is provided with LEDs. In FIG. 5, LEDs are inset at the points 58 and are angled to transmit light in approximately the same direction. As before, rotation of the chuck 56 moves the LEDs with respect to the detector 10 producing a pattern which is obscured when a tool 30' is brought into the beam path. When transmitted light is used, the pattern of data produced by rotation of the chuck may vary both in intensity and frequency/wavelength. This can be used to ascertain actual chuck/spindle speed (rather than merely knowing the demanded speed) and, use of different colours can show when one of the LEDs has blown.

Software in the machine tool controller 50 can be used to inform the machine cutting program to carry on the machining process when a tool has been detected (either a rotating tool or a non-rotating lathe type tool).

One device and three methods of detecting an object have been described above. Many variants which fall within the ambit of the invention will be readily apparent to the skilled addressee. For example, the detection of objects other than tools is possible provided the object to be detected or some part near the object is moving. Rotation of the object to be detected is described but other repetitive motion is possible to give the same results. Laser light has been described however, any visible or non-visible light may be provided from any source including ambient light. Dependent on the speed of movement of the object, the intervals at which the recording of the amount of light detected at detector 18 can be increased or decreased. A binary register of up to 36 bits has been described but other sizes are possible and binary data need not be used.

If binary data is recorded, any number of bits can be used in place of the single bit described above. In such instances it will then be possible to record the amount of light present at the receiver, not just an on/off value as described above.

In an enhancement to the above, a unit can be provided to send a signal which corresponds to the light which would be reflected from a tool. Thus, the tool detector can be installed and checked on a machine tool without the need to bring a tool adjacent the detector. The unit could comprise a simple rotating mirror or other reflective surface, but is preferably a solid state arrangement which produces a pulse of laser light in response to a similar pulse sent by the tool detector.

The invention claimed is:

1. A device for detecting the presence or absence of an object which has repetitive motion, the device comprising
   a receiver for receiving a signal reflected or emitted from the object; and
   circuitry for determining the presence or absence of the object to be detected, characterised in that
   the circuitry is configured to record the signal from the receiver as a pattern of data during at least part of the repetitive motion of the object during an inspection of the object, and to compare the data with a data pattern recorded during a previous repetitive motion of the object during the same inspection of the object, and to produce an output signal based on the comparison.

2. A device according to claim 1 wherein, the signal is received during discrete time intervals.

3. A device according to claim 1 wherein, the signal is light.

4. A device according to claim 3 wherein, the light is from a transmitter and the receiver receives light from the transmitter in order to produce the said signal.

5. A device according to claim 1 wherein, the circuitry determines the value of signal received at the receiver and produces a binary value.

6. A device according to claim 5 wherein, if the signal reflected from the object exceeds a predetermined threshold then the value of the data is recorded as a 1.

7. A device according to claim 1 wherein, when the previously recorded data has a correlating relationship with the pattern of data then a tool found signal is issued by the circuit.

8. A device according to claim 1 wherein, when the previously recorded data is no longer matched by the pattern of data then a tool found signal is issued by the circuit.

9. A device according to claim 3 wherein, the transmitted light is transmitted with varying intensity.

10. A method for detecting the presence or absence of an object which has repetitive motion, the method comprising the steps of:
    receiving a signal reflected or emitted from the object at a receiver;
    recording the signal from the receiver as a pattern of data during at least part of the repetitive motion of the object during an inspection;
    comparing the data with a data pattern recorded during a previous repetitive motion of the object during the same inspection of the object; and
    producing an output signal based on the comparison.

11. A method according to claim 10 wherein, the pattern of data is a binary pattern.

12. A method according to claim 11 wherein, if the signal reflected from the object exceeds a predetermined threshold then the value of the data is recorded as a 1.

13. A method according to claim 10 wherein, when the previously recorded data has a correlating relationship with the pattern of data then a tool found signal is issued by the circuit.

14. A method according to claim 10 wherein, the signal is light and the light has varying intensity.

15. A device for detecting the presence or absence of an object which has repetitive motion, the device comprising:
a receiver for receiving a signal from the object; and
circuitry for determining the presence or absence of the object to be detected,
characterized in that
the circuitry records the signal from the receiver as a pattern of data during at least part of the repetitive motion of the object during an inspection of the object and produces an object detection output signal either when the pattern matches a pattern recorded during a previous repetitive motion of the object during the same inspection of the object or when the pattern no longer matches the pattern.

16. A detection device for detecting the presence or absence of an object, the device comprising a light transmitter and a light receiver positioned relative to the light transmitter to receive light reflected by the object, comprising:
circuitry for determining the presence or absence of the object to be detected, the circuitry being configured to record the signal from the receiver as a pattern of data during at least part of the repetitive motion of the object during an inspection of the object, and to compare the data with a data pattern recorded during a previous repetitive motion of the object during the same inspection of the object, and to produce an output signal based on the comparison,
transmitted light being transmitted with varying intensity.

17. A detection device according to claim 16 wherein, the varying intensity is a variation between no light and full light transmitted by the light transmitter.

18. A detection device according to claim 16 wherein, the light is transmitted periodically.

19. A detection device according to claim 16 wherein, the period is approximately 10-500 kHz.

* * * * *